(12) United States Patent
Wang (10) Patent No.: US 6,724,506 B1
(45) Date of Patent: Apr. 20, 2004

(54) METHOD AND APPARATUS FOR MEASURING AND INDICATING PAPER LEVEL IN A SHEET-FEEDING DEVICE

(75) Inventor: Bobo Wang, Palos Verdes Estates, CA (US)

(73) Assignee: Aetas Technology, Incorporated, Irvine, CA (US)

( * ) Notice: Subject to any disclaimer, the term of this patent is extended or adjusted under 35 U.S.C. 154(b) by 610 days.

(21) Appl. No.: 09/722,426

(22) Filed: Nov. 28, 2000

(51) Int. Cl.[7] .................................................. H04N 1/04
(52) U.S. Cl. ..................... 358/498; 358/474; 271/110; 271/117
(58) Field of Search ............................... 358/474, 498; 271/154, 110, 117

(56) References Cited

U.S. PATENT DOCUMENTS 5,622,364 A * 4/1997 Dutton et al. ................ 271/117

* cited by examiner

Primary Examiner—Edward Coles
Assistant Examiner—Heather D Gibbs
(74) Attorney, Agent, or Firm—Philip D. Freedman; Frederic Douglas (57) ABSTRACT

An imaging system includes an imaging subsystem for forming an image on a sheet, a tray for holding a supply of sheets, a ramp for directing a sheet from the tray into a paper path, a sensor in the vicinity of the paper path, a drive assembly and a processor connected to the drive assembly and the sensor. The drive assembly includes a movable roller configured to move the sheet into the paper path by moving a top sheet of a supply of sheets in the tray to the ramp. The sensor is configured to detect a sheet traveling in the paper path from the tray and to provide an output signal in response to the detection. The processor is configured to control movement of the roller, to receive and store an initial sheet level value, to receive the output signal from the sensor and to calculate a time, t, from activating the drive assembly to receiving the sensor output signal and to accordingly adjust the initial sheet level value. In a method for measuring sheet levels in an imaging system paper tray, a start time that a roller engages a paper sheet to feed the sheet from the paper tray to a paper path of the imaging system is recorded and a time the sheet passes a location along the paper path is sensed. A time difference between the start time and the time sensed is processed to provide a signal that represents a supply of sheets in the paper tray.

19 Claims, 4 Drawing Sheets

METHOD AND APPARATUS FOR MEASURING AND INDICATING PAPER LEVEL IN A SHEET-FEEDING DEVICE

BACKGROUND OF THE INVENTION

The present invention relates to a sheet-feeding device and imaging system incorporating such device. More particularly, the invention relates to an apparatus and method for measuring paper storage in an image forming apparatus.

A quality imaging system such as a printer or a photocopier requires consistent and error-free feeding of paper from a supply tray. One type of paper supply tray includes a ramped surface or dam at an end that is adjacent to the paper path in the printer. A roller assembly includes a roller that engages the top sheet of a paper stack held in the supply tray. The roller moves the top sheet up the dam and into the paper path of the printer.

Many photocopiers and printers include at least one feature that allows a user to easily determine when a paper supply tray is depleted of paper. However in instances, a user may desire to have advance notice of an empty feed paper tray. For example, if a paper supply tray has a capacity of 200 sheets, it may be desirable for a user to be aware that the supply tray is approximately half full, or contains approximately 100 sheets. Or, it may be desirable for a user to know that the supply tray is nearly empty so that paper can be replenished to complete a print job without interruption. Further, it may be desirable for a user to know that a number of printed pages in a requested print job is larger than an approximate number of sheets in the supply tray so that paper can be added prior to commencing a print job.

Various methods and apparatus exist for determining the approximate paper level within a paper supply tray. Such paper level indicators require relatively expensive additional printer hardware to sense the paper level; thereby increasing the cost of the printer. Generally, these methods and apparatus are used in conjunction with a supply tray wherein the paper rests directly on the bottom of the supply tray. For example, one method uses an arm that rests on the top of the paper stack and uses hardware to detect the angle of the arm.

In another paper level indicator, a stack of paper is disposed within a feeder module such that the trailing edges of the paper sheets are disposed at an acute angle relative to a bottom surface of the feeder module. A light source is disposed on top of the feeder module and a sensor is disposed on the bottom of the feeder module. As the sheets in the paper stack are used, the sensor receives more of the light that is output by the light source. The sensor operates a suitable electrical circuit to provide a "low" warning to a user when the height of the stack is such that the sensor is substantially exposed. This indicator is expensive and sometimes inaccurate.

There is a need for simple and error-free apparatus and method for detecting a paper level in a supply tray, particularly there is a need for a paper sensor system that can be used in conjunction with a novel imaging system that includes a drive assembly including a pick roller for moving a top sheet of a supply of sheets in a paper tray to a ramp, wherein the drive assembly is configured to maintain a constant spaced relationship between the roller and the ramp when the roller is moving a top paper sheet to the ramp.

BRIEF SUMMARY OF THE INVENTION

The present invention meets these needs by providing an imaging system comprising an imaging subsystem for forming an image on a sheet, a tray for holding a supply of sheets, a ramp for directing a sheet from the tray into a paper path, a sensor in the vicinity of the paper path, a drive assembly and a processor connected to the drive assembly and the sensor. The drive assembly includes a movable roller configured to move the sheet into the paper path by moving a top sheet of a supply of sheets in the tray to the ramp. The sensor is configured to detect a sheet traveling in the paper path from the tray and to provide an output signal in response to the detection. The processor is configured to control movement of the roller, to receive and store an initial sheet level value, to receive the output signal from the sensor and to calculate a time, t, from activating the drive assembly to receiving the sensor output signal and to accordingly adjust the initial sheet level value.

In an embodiment, an imaging system comprises an imaging subsystem for forming an image on a sheet, a tray for holding a supply of sheets, a ramp for directing a sheet from the tray into a paper path, a sensor in the vicinity of the paper path, a drive assembly and a processor connected to the sensor. The drive assembly includes a roller for moving a top sheet of the supply of sheets in the tray to the ramp with a reciprocating roller stroke; the drive assembly being configured to maintain a constant roller stroke distance between the roller and the ramp. The sensor is configured to detect a sheet traveling in the paper path from the tray and to provide an output signal in response thereto. The processor is configured to receive the sensor output signal and to accordingly adjust a value representing a sheet level in the tray.

In another embodiment, a method for measuring sheet levels in an imaging system paper tray, comprises recording a start time that a roller engages a paper sheet to feed the sheet from the paper tray to a paper path of the imaging system and sensing a time the sheet passes a location along the paper path. A time difference between the start time and the time sensed is processed to provide a signal that represents a supply of sheets in the paper tray.

DETAILED DESCRIPTION OF THE INVENTION

According to the invention, an apparatus is provided that includes a processor that can be connected to a registration sensor disposed in a paper path. Also, the processor can be connected to a roller assembly. The processor controls operation of a sheet roller of the roller assembly and receives a signal from the sensor indicating that a picked sheet is present. The processor determines the relative position of an uppermost sheet in a supply tray based upon an initial actuation of the sheet roller and the sensing of the picked sheet by the sensor. The relative position of the uppermost sheet may be determined based upon elapsed time, or based upon the distance the picked sheet travels to reach the sensor.

In this application, the term "paper" or "sheet" means paper, transparency film, or other comparable material used for hardcopy output.

In an embodiment, the invention comprises an apparatus that includes a supply tray for holding a plurality of paper sheets. The apparatus defines a paper path through which a paper sheet travels. A roller assembly includes a movable roller that is configured to move the paper sheet into the paper path. A sensor is disposed in association with the paper path at a particular location, and is adapted to detect a paper sheet traveling through the paper path and to provide an output signal. A processor connected to each of the roller assembly and the sensor controls movement of the movable roller and receives the sensor output signal.

When the paper tray is full of paper, the top sheet of paper is located approximately at a location indicated MAX; and when the paper tray is nearly empty, the top sheet of paper is located approximately at a location indicated MIN. An output sensor is located upstream from a roller, beyond the MAX location. When a motor activates in response to a processor, the motor drives the roller to engage the top sheet of paper. This top sheet of paper moves into a paper path and is sensed by the sensor.

To determine the amount of paper in the tray, the processor calculates the time it takes to urge the paper into the paper path and to activate the sensor. This time, t, can be calculated as the span of time between the instance of activating the motor and the instance the leading edge of the paper passes the sensor.

To determine the paper supply, the processor can compare the value of time t to known set of times in a look-up table in memory to determine an approximate level of paper in the tray. Alternatively, the processor may calculate a distance d from a known angular velocity V of the roller and time t (d=Vt). A total distance D between the MIN location of the tray and the sensor is known. A supply distance s may be calculated as the difference between distances D and d. The calculated distance s can then be compared to a known set of distances in a look-up table. In either case, the processor issues a signal to an indicator indicative of the estimated level of paper from the look-up table. As the paper tray empties, distance d approaches the maximum distance D.

The processor can average the time t of a number of successive paper passes to estimate the level of paper in the tray. In addition, a highest possible value of time t can be stored in the memory so that if a calculated time exceeds the maximum, the processor knows that the calculated time is invalid, resulting from a paper jam.

This type of paper storage measurement device is particularly advantageous when incorporated into imaging systems such as printers and photocopiers. This invention enables the reduction of paper volume measurement errors caused by paper mishandling or motor slip. The result is more consistent and error-free paper feeding that enhances the operability of an imaging system.

These and other features will become apparent from the drawings and following detailed discussion, which by way of example without limitation describe preferred embodiments of the present invention. In the drawings, corresponding reference characters indicate corresponding parts throughout the several views. The exemplification set out herein illustrates a preferred embodiment of the invention, and such exemplification is not to be construed as limiting the scope of the invention.

Figure 1:
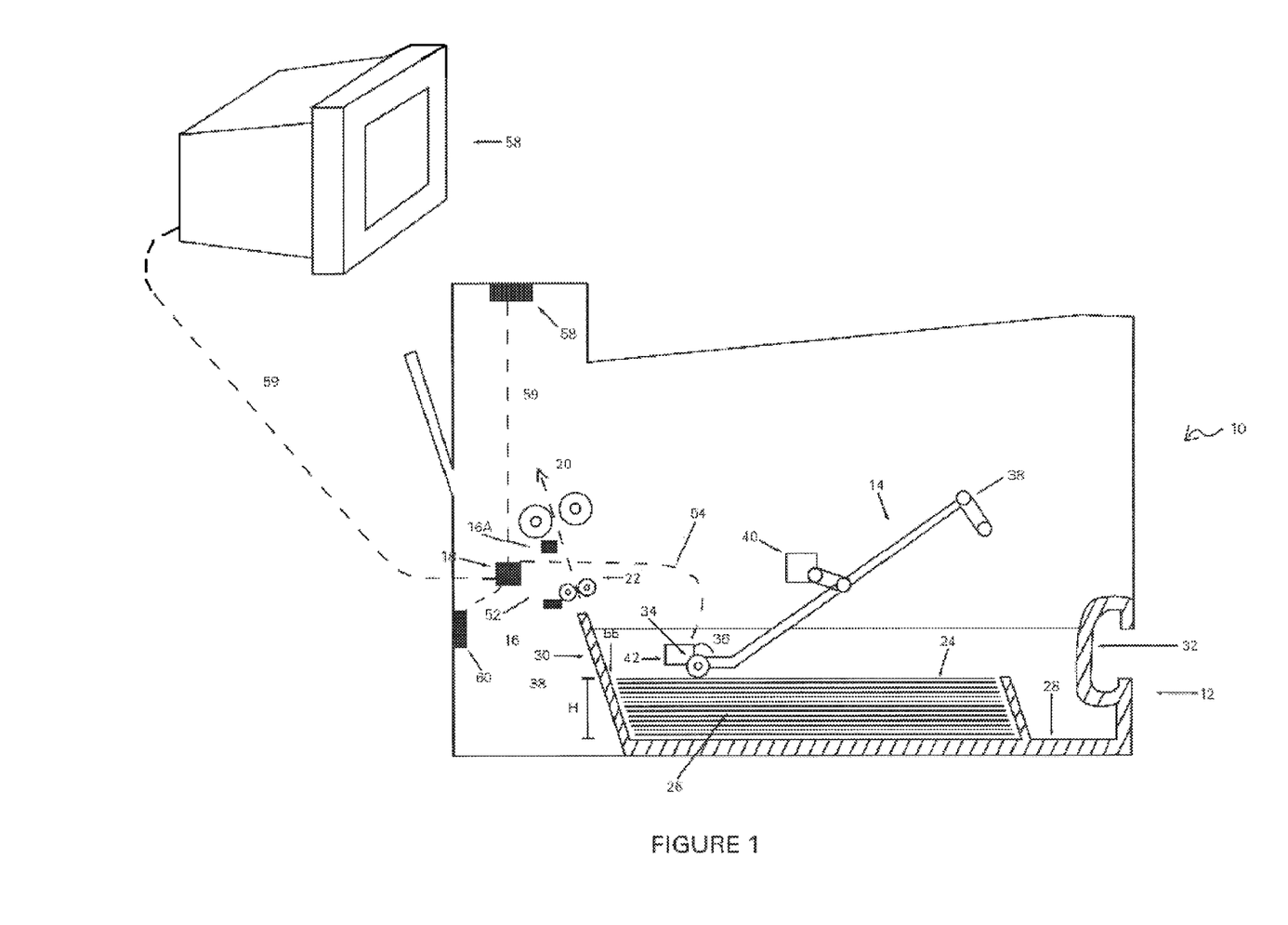
FIG. 1 is a schematical, side view of an embodiment of the invention.

An embodiment of an image forming apparatus of the invention, is shown in FIG. 1. The apparatus shown is in the form of an electrophotographic printer 10. Printer 10 includes a supply tray 12, picker assembly 14, sensor 16 and processor 18. Printer 10 also defines a paper path, through which paper sheets travel, as indicated generally by arrow 20. A plurality of rollers 22 is disposed within printer 10 along paper path 20 for guiding and/or feeding a sheet through the paper path 20.

Supply tray 12 includes a plurality of paper sheets 24 defining a paper stack 26 that is disposed within supply tray 12. Paper stack 26 rests directly on a bottom 28 of supply tray 12. As a paper sheet 24 is drawn from the top of stack 26, the height of the stack diminishes. A ramped surface or dam 30 is disposed at an end of supply tray 12 adjacent to paper path 20. In the embodiment shown, dam 30 is disposed adjacent to the end of supply tray 12. At the other end, the tray 12 defines a handle 32 to allow a user to insert or remove the tray 12 from printer 10. In operation, picker assembly 14 pushes a sheet 24 against the dam 30. Dam 30 is positioned at an angle relative to bottom 28 such that sheet 24 is deflected in an upward direction indicated by paper path 20.

Picker assembly 14 includes a movable picker 34, which rests on top of a top paper sheet 24 of stack 26. Picker 34 is in the form of a pick roller, which rotates as indicated by arrow 36 to move a paper sheet 24 into paper path 20. More particularly, pick assembly 14 is pivotable about a pivot point 38 such that pick roller 34 is caused by gravitational force to rest against a top sheet 24. A drive train housing 40 includes a plurality of gears, pulleys, belts or the like for transferring rotational power from a power source to pick roller 34. The power source may be in the form of a motor, such as a stepper motor 42, forming a part of picker assembly 14 or it may be in the form of a separate motor (not shown) which is coupled to picker assembly 14 using a clutch or the like. Stepper motor 42 is connected to and controlled by processor 18 via conductor 54.

Figure 2:
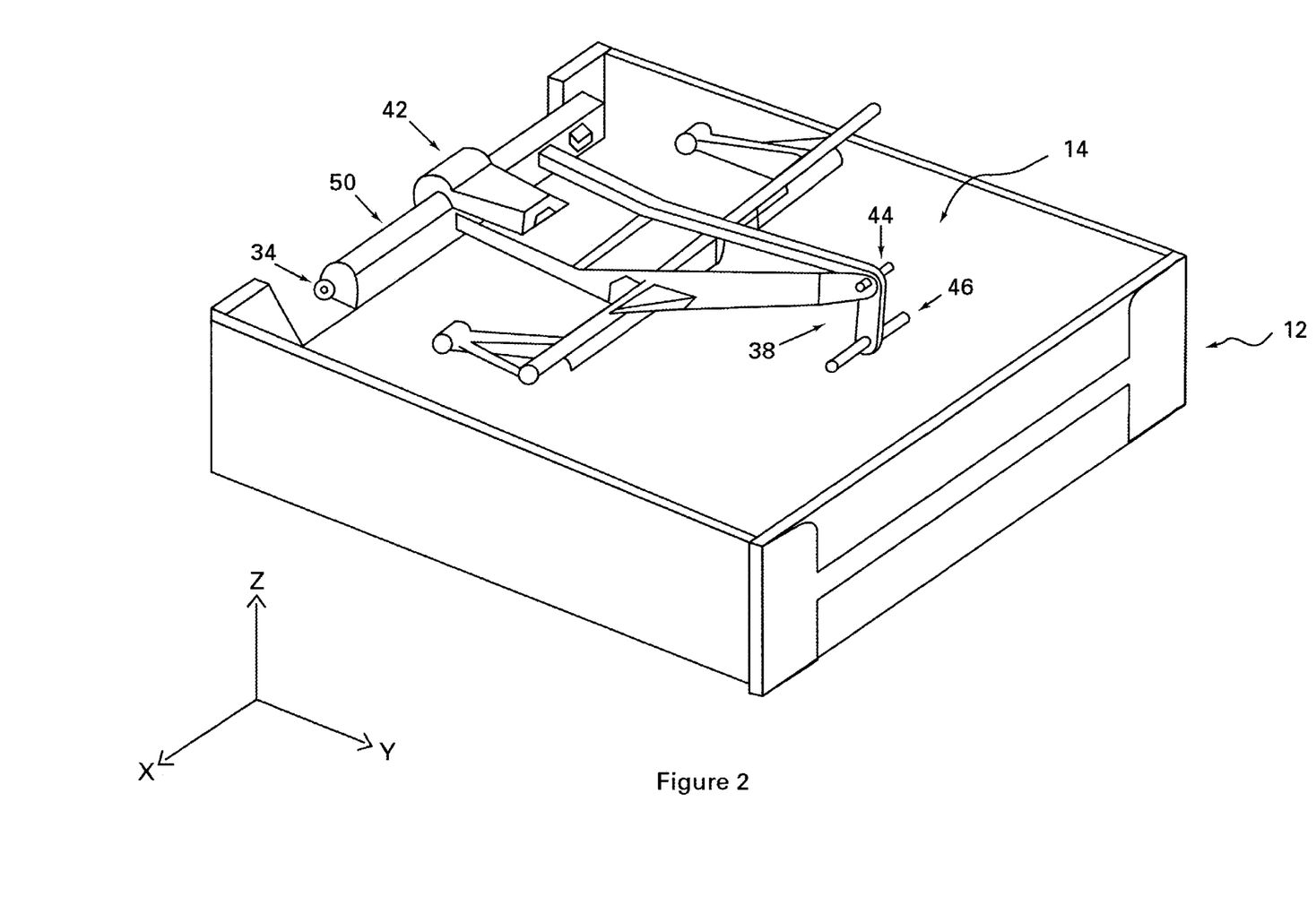
FIG. 2 is a perspective view of a supply tray and picker assembly shown in FIG. 1.

One embodiment of picker assembly 14 of the present invention is shown in greater detail in FIG. 2. Picker assembly 14 rotates about a longitudinal axis of a pivot shaft 44 having a cam 46 at a distal end thereof. The longitudinal axis of pivot shaft 44 defines pivot point 38 (FIG. 1). Cam 46 engages a projecting surface 48 of supply tray 12. Cam 46 operates upon insertion and removal of supply tray 12 to swing picker assembly 14 up and out of the way for removal of supply tray 12. Cam 46 is also engageable by projecting surface 48 of supply tray 12 to allow pick rollers 34 to top a contact paper sheet 24 upon insertion of supply tray 12 into printer 10. Drive train housing 40 includes a plurality of gears (not shown), which interconnect stepper motor 42 with output shafts 50 driving pick rollers 34. U.S. patent application Ser. No. 08/406,233 entitled "Auto Compensating Paper Feeder" shows details of a gear train, which may be used or adapted for use with picker assembly 14 of the present invention. Application Ser. No. 08/406,233 is assigned to the assignee of the present invention and is incorporated herein by reference.

Referring again to FIG. 1, sensor 16 within printer 10 is disposed in association with paper path 20 at a particular location to sense passing paper sheet 24. For example, sensor 16 may be located along paper path 20 prior to feed rollers 22 as shown by solid line. Alternatively a sensor 16A can be located along paper path 20 at a point downstream of feed rollers 22. In some situations it may be desirable to include a sensor at each location. Sensor 16 detects a leading edge of a paper sheet 24 traveling through path 20. Sensor 16 is connected to processor 18 via conductor 52. The sensor 16 provides an output signal to processor 18 upon detecting the leading edge of a paper sheet 24. Sensor 16 may be an optical or magnetic sensor that is actuated upon movement of a mechanical flag, such as an arm upon engagement by the picked paper sheet.

Processor 18 generally is of known construction and may include various required or optional hardware, such as a microprocessor, RAM memory, data buffer, etc. Processor 18 controls operation of stepper motor 42 and in turn controls movement of pick rollers 34. More particularly, processor 18 provides a signal over conductor 54 that is used to control operation of stepper motor 42. Processor 18 also receives an output signal from sensor 16 indicating that a leading edge of a paper sheet 24 has been sensed. Processor 18 monitors the time and/or distance of travel of paper sheet 24 by monitoring the start of rotation of pick rollers 34 and the output signal from sensor 16. The time or distance that any particular paper sheet 24 travels before a leading edge 56 thereof reaches sensor 16 increases as the height "H" (FIG. 1) of paper stack 26 decreases. Processor 18 uses such times and/or distances to determine an approximate vertical position of an uppermost paper sheet 24 of paper stack 26 with respect to bottom 28 of supply tray 12. From this, the processor can determine a paper level or height of paper stack 26.

In the embodiment shown in FIG. 2, the number of steps that each paper sheet 24 is moved from the time it is picked, to receipt of an output signal from sensor 16 can be monitored. The gear ratio between the output of stepper motor 42 and pick rollers 34 is known, hence a single step of stepper motor 42 provides a known rotation of pick rollers 34. The rotation of pick rollers 34 can in turn be converted into a distance from the value of the circumference of the rollers. The distance of each rotation is then multiplied by the number of rotations to obtain a value representing the distance a sheet 24 moves from pickup to sensing.

A motor that operates on a continuous basis at a known rotational speed can also be used to determine distance from pickup to sensing. The time from picking a paper sheet 24 until sensed by sensor 16 can be monitored. The time can then be converted into a distance by using the known rotational speed of the motor.

Also, distance can be calculated from time. In this embodiment, the sensor 16 can be located adjacent paper path 20 downstream, at a location where the sheet is being conveyed with rollers 22 just free from rollers 34. The elapsed time between initiation of operation of rollers 34 and sensing of the sheet 24 by sensor 16 can be monitored. This value can then be converted into a distance from (1) a known rotational speed of rollers 34, (2) rotational speeds of rollers 22 and (3) the circumferences of rollers 22 and 34 as follows.

Prior to arrival at rollers 22, the sheet 24 does not travel at a constant speed. Hence, the calculation of distance must account for acceleration characteristics of roller 34. This can be achieved by calculating the integral (I) of the velocity of the surface of roller 34 from the time movement of roller 34 is initiated (t0) to the time of reaching the surface of rollers 22 ($t_1$). The integral I is then added to a distance (D) the sheet travels during constant velocity. Distance D corresponds to the constant speed value multiplied by the elapsed time between the sensor 16 first sense time ($t_2$) and time $t_1$.

Processor 18 can be connected via a single or multi-line conductor 59 to a display 58 for displaying an indication of the paper level of paper stack 26. Such an indication may be in the form of a percentage full designation; an empty, near empty, full or other like designation; a bar graph or other graphical designation, etc. Moreover, display 58 can be a display on a host computer in addition to or instead of being incorporated into printer 10 as shown in FIG. 1.

Processor 18 can also be connected via a multi-line conductor 62 to a non-volatile memory 60, which preferably is in the form of a read only memory (ROM) or a programmable non-volatile memory such as an EEPROM or flash memory. Memory 60 can be separate from processor 18 as shown, or can be incorporated with the processor. Memory 60 can include parameters stored therein, which are associated with the vertical position of a paper sheet 24 within supply tray 12. Such parameters can correspond to a height representing a minimum number of paper sheets within supply tray 12 (i.e., an "Empty" value), or a maximum number of paper sheets 24 within supply tray 12 (i.e., a "Full" value). The memory can include time variables, for example the memory can include tables corresponding to printer speed. Memory 60 can also include a look-up table so that one or more data values corresponding to output signals from sensor 16 can be compared with look-up values.

Figure 3:
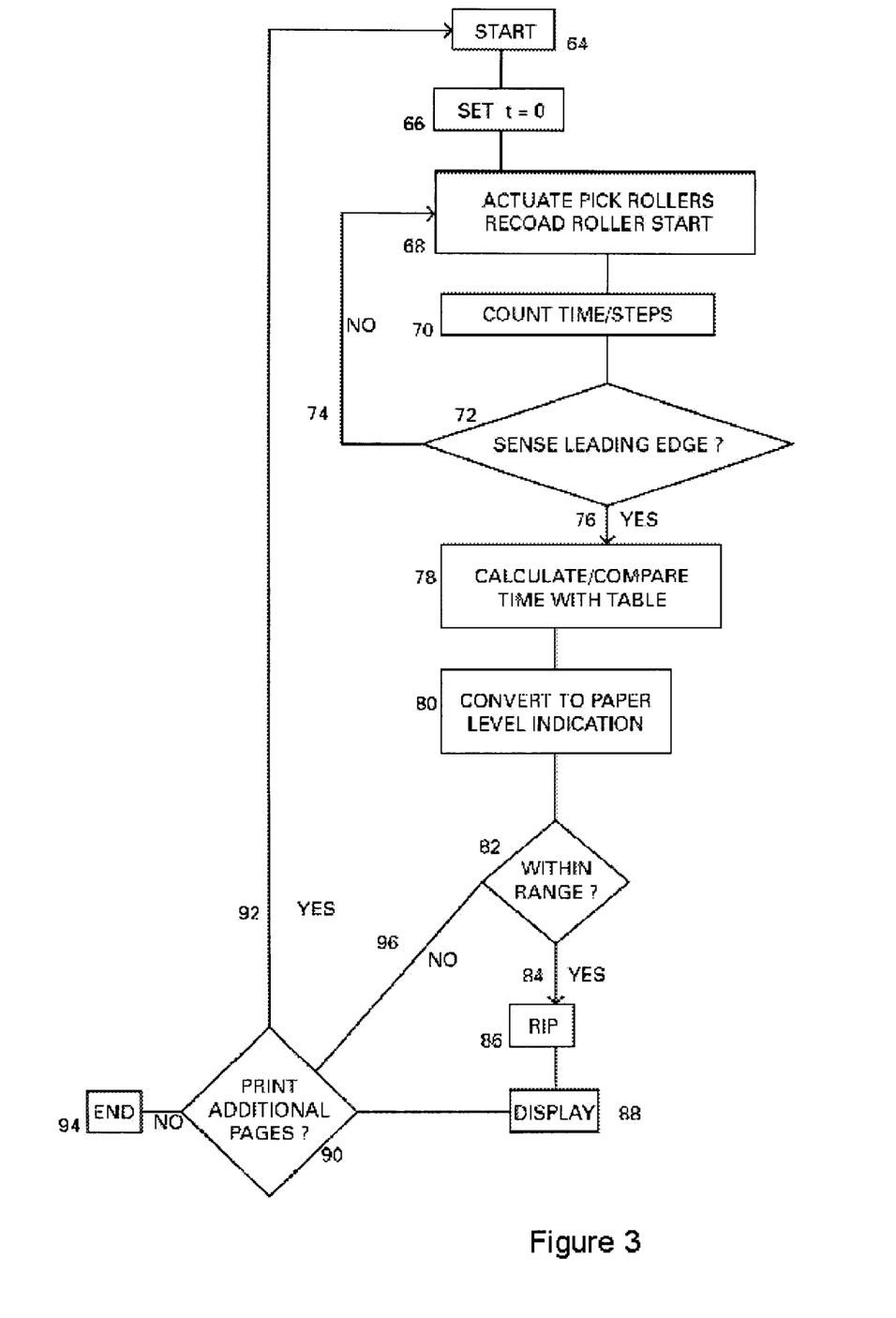
FIG. 3 is a flowchart of an embodiment of the invention for detecting a paper level in a supply tray.

Referring now to FIG. 3, there is shown a flow chart of an embodiment of a method of the present invention for detecting a paper level in a supply tray where the sensor is positioned as sensor 16 of FIG. 1. First, printer 10 receives a print command, e.g., either manually or from a host computer. The command can include information as to which page source or supply tray should be utilized (block 64). Processor 18 sets a zero count for the number of steps or time which stepper motor 42 is operated (block 66). Processor 18 then actuates stepper motor 42, which in turn actuates pick rollers 34 (block 68). Stepper motor 42 is stepped by one step and the count is incremented one numeric value so that the total count equals the number of stepper motor 42 steps (block 70). A decision can be made as to whether sensor 16 has sensed the leading edge of the corresponding picked paper sheet (decision block 72). If sensor 16 has not yet sensed the leading edge of the picked paper sheet (i.e., processor 18 has not received an output signal from sensor 16 via conductor 52), then pick roller 34 is moved again by stepping stepper motor 42 (line 74) and the count is incremented again by one. On the other hand, if sensor 16 has sensed a leading edge of a paper sheet 24 (line 76), then data values of the signals received from sensor 16 are mathematically operated upon using an averaging or flooring technique (block 78).

Alternatively, a free running counter incrementing at a known rate may be used. The counter begins incrementing at the start of rotation of roller 34 and continues to increment a count until sensor 16 detects the leading edge 56 of paper sheet 24.

Averaging or flooring techniques can be used to inhibit an erratic datum value from erroneously causing an improper paper level indication. For example, possibly slippage can occur between pick rollers 34 and a top paper sheet 24, thereby resulting in an erratic datum value. Processor 18 can perform a mathematical operation on a discrete number N of stored data values so that the effect of an erratic datum value is reduced. For example, processor 18 may perform an averaging computation on every four data values (or other discrete number of data values ranging, e.g., between 3 and 10 data values). If the current datum value falls within the range of upper and lower thresholds or comparison value stored in a look-up table in memory 60, then the average of the previous N data values is used as an indication of the paper level within supply tray 12. On the other hand, if the current datum value is outside of the threshold or comparison value as a result of slippage, then the minimum data value of the discrete number of data values can be used as an indication of paper level. In embodiments in which memory 60 includes a reprogrammable memory unit, a threshold value can be updated based upon such factors as variations in manufacturing tolerances and wear. It will be appreciated that other techniques for reducing the effect of erratic data value can also be employed and are within the scope of this invention.

Continuing with the description of FIG. 3, the count that is processed using an averaging or flooring technique (block 78) can be converted to an indication of the paper level within supply tray 12 (block 80). A determination can then be made as to whether the paper level changed from one level to another (decision block 82). The type of level indication and sensitivity of level indication may be varied from one application to another. If the determination as to level change is YES (line 84), then a new level indication is passed to a Raster Image Processor or RIP (block 86) of printer 10 (RIP is not shown in FIG. 1). The RIP causes the new paper level indication to be displayed on display 58 of printer 10 and/or a display screen of a host computer (block 88). Thereafter, a determination is made as to whether additional pages are to be printed (decision block 90). Control is passed back to block 64 via line 92 if the answer is YES and is ended at 94 if the answer is NO. If the determination as to whether or not a level change occurred at decisional block 82 is NO (line 96), then control passes directly to decisional block 90 to decide whether more pages exist.

Figure 4:
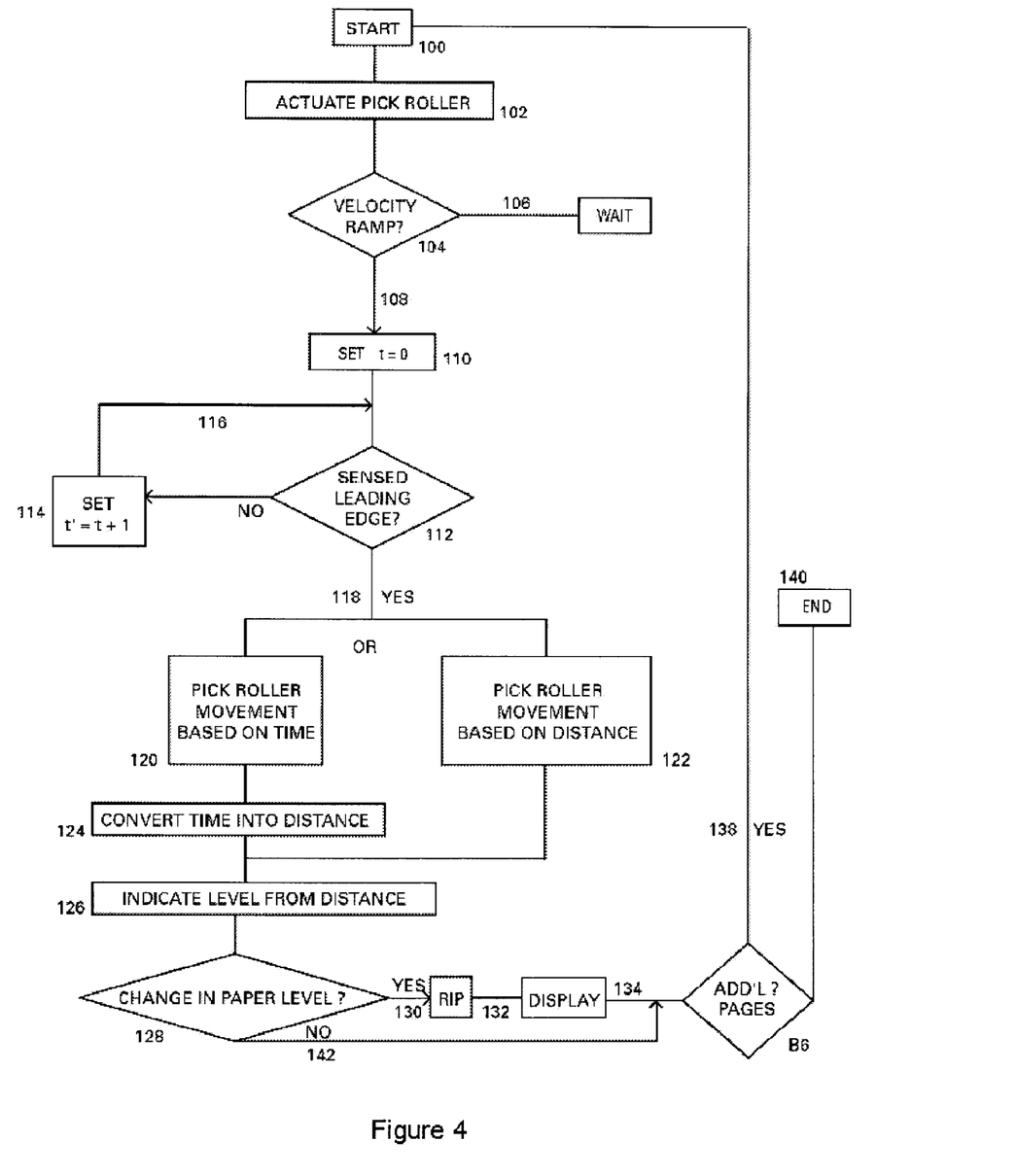
FIG. 4 is a flowchart of an alternative method of the invention for detecting a paper level in a supply tray.

Referring now to FIG. 4, a flowchart is shown of an alternative embodiment of the method of the invention where the sensor is positioned as sensor 16A in FIG. 1. Although not readily apparent from FIG. 1, the position of sensor 16A is intended to correspond to a paper sheet 24 sensing position at which a trailing edge of the sheet has disengage from pick rollers 34. At this position, paper sheet 24 is being moved by rollers 22. It may be desirable at this point to stop pick rollers 34 slightly prior to or at the time sheet 24 is disengaged to prevent engagement with a next paper sheet 24. In this manner, rotation of rollers 34 is limited to only the sensed sheet. The distance traveled by the leading edge of a picked paper sheet 24 prior to being sensed by sensor 16A is therefore a function of the circumferential distance moved by pick rollers 34 as well as the distance moved by feed rollers 22.

First, printer 10 receives a print command, e.g., either manually or from a host computer. The command can include information as to which page source or supply tray is to be utilized by printer 10 (block 100). Processor 18 actuates stepper motor 42, which in turn actuates pick rollers 34 (block 102). Stepper motor 42 starts from a zero velocity and accelerates to a known velocity corresponding to an operating speed of a paper feed assembly, including rollers 22. The acceleration results in picker rollers 34 exhibiting one of a plurality of possible velocity ramps or profile curves. Dependent on the particular velocity curve exhibited by pick rollers 34, a certain number of steps or a predetermined period of time occurs before pick rollers 34 reach the substantially constant velocity at which the paper feed assembly operates. A decision is thus made as to whether the velocity ramp of pick rollers 34 has finished or leveled off (decision block 104). If pick rollers 34 are still accelerating, i.e., the velocity ramp of pick rollers 34 has not yet finished, then a wait state results as indicated by line 106. On the other hand, if the velocity ramp of pick rollers 34 is finished (line 108), processor 18 sets a zero count for the number of steps or time which stepper motor 42 is operated (block 110). A decision is then made as to whether sensor 16A has sensed the leading edge of the corresponding picked paper sheet (decision block 112). If sensor 16A has not yet sensed the leading edge, i.e., processor 18 has not received an output signal from sensor 16A, then the count is incremented by one (block 114). Control then passes back to decision block 112 via line 116. On the other hand, if sensor 16A senses a leading edge of a paper sheet 24 (line 118), then control passes to either block 120 or block 122. Control passed to block 120 if the basis for determining movement of pick rollers 34 is time. Control passes to block 122 if the basis for determining movement of pick rollers 34 is distance. It will be appreciated that if the basis for determining movement of pick rollers 34 is distance and control passes from decision block 112 to block 122 (as indicated by the phantom line portion of line 118), then block 120 is not utilized.

In the event that the value of count is dependent upon time, then a mathematical conversion is carried out in block 120. The mathematical conversion converts the time (or count) into a distance using the known rotational speed of motor 42 and the gearing between motor 42 and pick rollers 34. In block 122, the distance corresponding to the distance that a picked paper sheet 24 moves during the velocity ramp of pick rollers 34 is added to the distance moved by the paper sheet corresponding to the value of "count." In general, this consists of adding a predetermined ramp velocity distance that can be determined empirically by measuring the distance traveled by paper sheet 24 during the velocity ramp of pick rollers 34 (block 124). Again an averaging or flooring technique can be utilized as described with regard to block 78 in FIG. 3. The count is then converted to an indication of the paper level within supply tray 12.

A determination is then made as to whether the paper level changed (decision block 128). The type of level indication and sensitivity of level indication can be varied from one application to another. If the determination is YES (line 130) then a new level indication is passed to a RIP (block 132) of printer 10. The new paper level can be displayed on display 58 of printer 10 and/or on a display screen of a host computer (block 134). Thereafter, a determination is made as to whether or not additional pages are to be printed (decision block 136). Control passes back to block 100 via line 138 if the answer is YES and ends at 140 if the answer is NO.

On the other hand, if the determination as to whether or not a level change occurred at decision block 128 is NO (line 142), then control passes directly to decision block 136 for processing as previously described.

The present invention overcomes drawbacks of conventional approaches for feeding sheets by providing consistent and substantially error-free sheet-feeding. One of the features of the present invention is that a substantially constant spaced relationship is maintained between a sheet-feeding roller and a ramp for directing the sheets out of a supply tray. This constant spaced relationship is maintained regardless of the level of sheet material (e.g., paper) in the supply tray. According to a preferred embodiment of the invention, an imaging system includes an imaging subsystem for forming an image on a sheet, a tray for holding a supply of sheets, a ramp for directing a sheet from the tray to the imaging subsystem and a drive assembly. The drive assembly includes a roller for moving a top sheet of the supply of sheets in the tray to the ramp. According to the present invention, the drive assembly is configured to maintain a constant spaced relationship between the roller and ramp when the roller is moving the top sheet to the ramp. More particularly, the drive assembly is configured to maintain the spaced relationship regardless of a level of the supply of sheets in the tray.

In another preferred embodiment, the imaging system is a printer, such as a color laser printer, and the imaging subsystem forms images according to electrophotographic (EPG) principles. The sheet material held in the tray may be paper, transparencies, label sheets, cards, envelopes, and so on. Preferably, the ramp includes one or more lowfriction members that provide a smooth contact surface against which the roller may drive the sheets. In addition, the ramp is preferably disposed at an angle so as to further reduce the level of friction the top sheet needs to overcome in moving across the ramp. In this regard, the tray may include retaining structure for holding the supply of sheets in at an angle that corresponds to the angle of the ramp, preferably so that a leading edge of each of the sheets in the tray abuts the ramp.

According to another preferred embodiment of the invention, the path that a sheet travels before engaging with another component of the imaging system, for example, a transferring unit of the imaging subsystem, is minimized to reduce the likelihood of jamming error. In this regard, a top edge of the ramp may be disposed at or near the imaging subsystem. To further enhance the relatively short distance, the imaging subsystem may be disposed within the imaging system at an angle so that one of the ends may be positioned near the top edge of the ramp.

According to another preferred embodiment of the invention, a sheet feeder for an imaging system includes a linkage and a roller. The roller is disposed on the linkage and contacts and drives a sheet from a supply of sheet material. The linkage is configured to move the roller substantially linearly as the supply of sheet material decreases, preferably along an angulated linear path. The sheet feeder may also include a ramp for directing the sheet driven from the supply of sheet material by the roller to an imaging subsystem of the imaging system. In this embodiment, the linkage may be configured to move the roller along a path that is substantially parallel to the ramp. Alternatively, the linkage may be configured to maintain a substantially constant spaced relationship between the roller and the ramp regardless of a level of the supply of sheet material. A motor may be disposed on the linkage for driving the roller.

According to preferred methodology of the invention, a method for feeding sheets in an imaging system includes moving a roller for contacting and driving sheets from a supply of sheet material substantially linearly as the supply of sheet material decreases. The linear movement is preferably in a path that is substantially parallel to a ramp for directing the sheets from the supply of sheet material to an imaging subsystem.

While preferred embodiments of the invention have been described, the present invention is capable of variation and modification and therefore should not be limited to the precise details of the Examples. The invention includes changes and alterations that fall within the purview of the following claims.

What is claimed is:

1. An imaging system, comprising
   an imaging subsystem for forming an image on a sheet,
   a tray for holding a supply of sheets;
   a ramp for directing a sheet from the tray into a paper path;
   a drive assembly including a movable roller configured to move the sheet into the paper path by moving a top sheet of a supply of sheets in the tray to the ramp;
   a sensor in the vicinity off the paper path and configured to detect a sheet traveling in the paper path from the tray and to provide an output signal in response thereto; and
   a processor connected to the drive assembly and the sensor; the processor configured to control movement of the roller, to receive and store an initial sheet level value, to receive the output signal from the sensor and to calculate a time, t, from activating the drive assembly to receiving the sensor output signal, to calculate a distance d from a known angular velocity V of the roller and time t and to accordingly adjust the initial sheet level value.

2. The imaging system of claim 1, wherein the processor is configured to store a total distance D between a location of the tray and the sensor and to calculated a distance s as the difference between distances D and d and to accordingly adjust the initial sheet level value.

3. The imaging system of claim 1, wherein the processor is configured to compare distances with a known set of distances in a look-tip table and to accordingly adjust the initial sheet level value.

4. The imaging system of claim 1, wherein t is calculated as a span of time between activating the drive assembly and detection of a leading edge of the paper by the sensor.

5. The imaging system of claim 1, additionally comprising a display connected to the processor to display an indication of the sheet level value stored in the processor.

6. The imaging system of claim 1, wherein the drive assembly includes a pick roller for moving a top sheet of the supply of sheets in the tray to the ramp; the drive assembly being configured to maintain a constant roller stroke distance between the roller and the ramp when the roller is moving the top sheet to the ramp.

7. The imaging system of claim 6 wherein the drive assembly is configured to maintain the roller stroke distance constant independent of a level of the supply of sheets in the tray.

8. The imaging system of claim 1, additionally comprising a step motor to drive the imaging system.

9. The imaging system of claim 8, wherein the processor is further configured to store a gear ratio value of the step motor to the roller, to count a number of steps or the motor between pick up of a paper sheet by tile roller to receipt of the output signal from the sensor and to convert the count into a distance value.

10. The imaging system of claim 1 wherein the imaging subsystem is configured to form images electrophotographically.

11. An imaging system comprising:
    an imaging subsystem for forming an image on a sheet;
    a tray for holding a supply of sheets;
    a ramp for directing a sheet from the tray to the imaging subsystem;
    a drive assembly including a roller for moving a top sheet of the supply of sheets in the tray to the ramp with a reciprocating roller stroke; the drive assembly being configured to maintain a constant roller stroke distance between the roller and the ramp independent of a level of the supply of sheets in the tray;
    a sensor in the vicinity of the paper path and configured to detect a sheet traveling in the paper path from the tray and to provide an output signal in response thereto; and
    a processor connected to the sensor; the processor configured to receive the sensor output signal and to accordingly adjust a value representing a sheet level in the tray.

12. The imaging system of claim 11 wherein the imaging subsystem is configured to form images electrophotographically.

13. A method for measuring sheet levels in an imaging system paper tray, comprising:

recording a start time that a roller engages a paper to feed the sheet from the paper tray to a paper path of the imaging system;

sensing a time the paper passes a location along the paper path; and processing a time difference, t, between the start time and the time sensed to provide a signal that represents a supply of sheets in the paper tray wherein a distance d is calculated from a known angular velocity V of a roller that engages the paper to establish the start time and time t and the signal that represents the supply of sheets in the paper tray is accordingly adjusted.

14. The method of claim 13, comprising sensing a time at railing edge of the paper passes the location.

15. The method of claim 13, wherein the imaging system is an electrophotographic imaging system.

16. The method of claim 13 comprising storing a value that represents a total distance D between a location of the tray and the sensor and to calculated a distance s as the difference between distances D and d and to accordingly adjust the signal that represents the supply of sheets in the paper tray;

17. The method of claim 16, comprising comparing distances with a known set of distances in a look-up table and accordingly adjusting the signal that represents the supply of sheets in the paper tray.

18. The method of claim 13, comprising displaying the signal representing the supply of sheets.

19. An imaging system, comprising an imaging subsystem for forming an image on a sheet, a tray for holding a supply of sheets;

a ramp for directing a sheet from the tray into a paper path;

a drive assembly including a movable pick roller for moving a top sheet of the supply of sheets in the tray to the ramp; the drive assembly being configured to maintain a constant roller stroke distance between the roller and the ramp independent of a level of the supply of sheets in the tray when the roller is moving the top sheet to the ramp;

a sensor in the vicinity of the paper path and configured to detect a sheet traveling in the paper path from the tray and to provide an output signal in response thereto; and a processor connected to the drive assembly raid the sensor; the processor configured to control movement of the roller, to receive and store an initial sheet level value, to receive the output signal from the sensor and to calculate a time, t, form activating the drive assembly to receiving the sensor output signal and to accordingly adjust the initial sheet level value.

* * * * *